(12) United States Patent  
Hussain et al.

(10) Patent No.: US 7,946,187 B2
(45) Date of Patent: May 24, 2011

(54) MASS FLOWMETER

(75) Inventors: Yousif Hussain, Weston Favell (GB); Christopher Rolph, Hartwell (GB); Tao Wang, Canterbury (GB)

(73) Assignee: Krohne AG, Basel (CH)

( * ) Notice: Subject to any disclaimer, the term of this patent is extended or adjusted under 35 U.S.C. 154(b) by 0 days.

(21) Appl. No.: 12/547,553

(22) Filed: Aug. 26, 2009

(65) Prior Publication Data

US 2010/0050783 A1  Mar. 4, 2010

(30) Foreign Application Priority Data

Aug. 27, 2008 (DE) .......................... 10 2008 039 867

(51) Int. Cl.
*G01F 1/84* (2006.01)
(52) U.S. Cl. ................................. 73/861.357
(58) Field of Classification Search ............. 73/861.357, 73/861.356, 861.355
See application file for complete search history.

(56) References Cited

U.S. PATENT DOCUMENTS

| | | | | |
|---|---|---|---|---|
| 2,821,084 A | * | 1/1958 | Altfillisch et al. | ....... 73/861.354 |
| 4,879,910 A | | 11/1989 | Lew | |
| 5,048,349 A | * | 9/1991 | Wolff | ....... 73/861.357 |
| 5,090,253 A | | 2/1992 | Kolpak | |
| 5,230,254 A | | 7/1993 | Craft | |
| 5,969,264 A | | 10/1999 | Rivkin | |
| 7,127,952 B2 | | 10/2006 | Bitto et al. | |
| 7,472,606 B2 | | 1/2009 | Seddon et al. | |

FOREIGN PATENT DOCUMENTS

| | | |
|---|---|---|
| DE | 35 03 841 A1 | 8/1986 |
| EP | 0 119 638 A1 | 9/1984 |
| WO | 96/08697 A2 | 3/1996 |

* cited by examiner

*Primary Examiner* — Jewel Thompson
(74) *Attorney, Agent, or Firm* — Roberts Mlotkowski Safran & Cole, P.C.; David S. Safran

(57) ABSTRACT

A mass flowmeter is provided which operates on the Coriolis principle, having (1) at least four measurement tubes which can oscillate and through which a medium can flow, (2) at least one oscillation generator for excitation of the oscillations of the measurement tube, and (3) at least one oscillation sensor for detection of the excited oscillations of the measurement tubes. The measurement tubes are preferably arranged closely in parallel such that the flow cross section covered by the measurement tubes covers as small an area as possible. The use of four or more compactly arranged measurement tubes advantageously allows for the measurement of a high mass flow rate with measurement tubes having a relatively small cross section and length, resulting in a mass flowmeter having compact length and width dimensions, and which requires only a relatively low energy oscillation generator for excitation of the oscillations of the measurement tubes.

9 Claims, 4 Drawing Sheets

MASS FLOWMETER

BACKGROUND OF THE INVENTION

1. Field of Invention

The invention generally relates to a mass flowmeter which operates on the Coriolis principle. The invention is specifically concerned with a compact mass flowmeter having at least three closely arranged measurement tubes which can oscillate and through which a medium can flow, at least one oscillation generator for excitation of the oscillations of the measurement tube, and at least one oscillation sensor for detection of the excited oscillations of the measurement tube.

2. Description of Related Art

Mass flowmeters which operate on the Coriolis principle have in principle been known for many years and allow the mass flow rate of the medium flowing through the measurement tube to be determined with high accuracy. In order to determine the mass flow rate, the Coriolis measurement tube is caused to oscillate by an oscillation generator or else by a plurality of oscillation generators—in particular at the natural frequency of one specific eigen form of an oscillation—and the oscillations which actually result are detected by means of oscillation sensors, and are evaluated. By way of example, the evaluation process comprises determination of the phase shift between the oscillations detected by each of the two oscillation sensors, with this phase shift being a direct measure of the mass flow rate. Coriolis mass flowmeters are known which have a single measurement tube, as well as those which have two and only two measurement tubes, with the measurement tubes either extending essentially in a straight line or being curved. Mass flowmeters with two measurement tubes have the advantage that—assuming that the measurement tubes, which are arranged adjacent, are excited in antiphase—the center of gravity of the system which is caused to oscillate remains unchanged overall, and the mass flowmeter is therefore externally mechanically neutral.

Depending on the quantity of the masses to be transported, the measurement tubes of the mass flowmeters have wildly differing nominal widths with different wall thicknesses. The measurement tubes must be designed overall such that they can withstand the necessary pressures and mechanical stresses that occur, and can be excited to oscillate in a manner which can be detected well with an acceptable consumption of energy. The measurement tubes must be further designed such that that the natural frequencies of the measurement tube through which the flow passes are in a desired range, and the measurement tubes do not cause unacceptable resistance to the mass flow. In order to allow relatively high mass flows to be detected, it is not simply possible just to increase the nominal widths of the measurement tubes of a known mass flowmeter, since this automatically changes the oscillation behavior of the measurement tubes. In consequence, an increase in the nominal width of measurement tubes is frequently associated with the measurement tube being lengthened, resulting an increase in all of the dimensions of the mass flowmeter.

SUMMARY OF THE INVENTION

A primary object of the present invention is to provide mass flowmeters operating on the Coriolis principle that are suitable for allowing a high mass flow rate, with the mass flowmeter having compact dimensions, and with oscillations being excited with comparatively little energy.

According to the invention, the stated object is achieved, first of all, and essentially in the case of the mass flowmeter under discussion in that more than two measurement tubes are provided, and in particular an even number of measurement tubes are provided. According to the invention, it has been found that an increase in the flow cross section and thus a Coriolis meter configuration which is suitable for higher mass flows can be achieved not only by increasing the nominal widths of the measurement tubes of the single-tube or two-tube mass flowmeters but also by providing further measurement tubes. The further measurement tubes advantageously make it possible to keep the oscillation behavior of the individual measurement tubes constant, and the measurement tubes can still be excited by oscillation generators which were previously suitable only for relatively small mass flowmeters, that is to say which could cope with only a relatively low mass flow rate. This means that it is also possible to produce mass flowmeters which are physically small in comparison to known single-tube or two-tube mass flowmeters, since the increase in the total flow cross section of the measurement tubes need not be compensated for by lengthening the measurement tubes since it is not essential to change the cross sections of the individual measurement tubes which are used.

It is particularly advantageous for the measurement tubes to be arranged closely—seen at right angles to the flow direction—that is to say for the flow cross section which is covered by the measurement tubes to be provided in as small an area as possible. According to the invention, when using standard measurement tubes, that is to say measurement tubes with a circular cross section, mass flowmeters allow the best possible utilization of space, and in any case utilize space considerably better than those mass flowmeters which use only a single measurement tube or two measurement tubes.

In one particularly preferred refinement of the mass flowmeter according to the invention, the measurement tubes are associated with measurement tube groups, with the measurement tubes in one measurement tube group being mechanically coupled to one another. This mechanical coupling does not refer to the couplings between the measurement tubes on the inlet and outlet sides, which necessarily result in the measurement tubes diverging or being joined together in connecting pieces on the inlet and outlet sides, with the connecting pieces being used with flanges which can connect the measurement tubes overall to a pipeline system. In fact, this refers to mechanical couplings which are provided within the oscillation area of the measurement tubes. The mechanical couplings between the measurement tubes of a measurement tube group result in the measurement tubes also being functionally associated with one another, and in simplification of the oscillation behavior of the measurement tube arrangement.

In one particularly preferred refinement of the invention, the measurement tubes in a measurement tube group are mechanically coupled at points along their extent in the flow direction, that is to say at individual points, in particular by supporting devices for the oscillation generators and/or for the oscillation sensors. This means that the measurement tube groups can be functionally excited as a unit, and the oscillations can be detected functionally by the measurement tube groups as a unit. Depending on the excited eigen forms of the measurement tube oscillations, and depending on the number of measurement tube groups, it is possible to provide one or more oscillation generators over the longitudinal extent of the measurement tubes in the measurement tube groups in order to excite the oscillations, and/or to provide oscillation sensors for detection of the excited oscillations.

In another preferred refinement of the invention, the measurement tubes in a measurement tube group are connected to one another essentially over their entire extent—seen in the flow direction—and in particular are soldered or welded to one another. This mechanical coupling means that the measurement tubes in a measurement tube group are linked to one another without any remaining degrees of freedom for individual movement. Nevertheless, an arrangement such as this can be used to provide a mass flowmeter form which operates on the Coriolis principle and is more compact overall than is possible with single-tube or two-tube mass flowmeters.

Further preferred refinements of the invention are distinguished in that the measurement tubes or measurement tube groups are associated with one another in pairs, and each pair is equipped with separate oscillation generators and/or with separate oscillation sensors. This makes it possible to excite and to evaluate two different pairs of measurement tubes or measurement tube groups independently of one another, in particular to excite them independently of one another in different eigen forms and to evaluate the oscillations of the eigen forms separately, without the excited oscillations being mutually superimposed.

In detail, there are now a multiplicity of possible ways to refine and develop the mass flowmeter according to the invention which operates on the Coriolis principle. In this context, reference is made to the patent claims which are dependent on Patent Claim 1 and to the following description of one preferred exemplary embodiment of the invention, with reference to the drawing, in which:

DETAILED DESCRIPTION OF THE INVENTION

Figure 1:
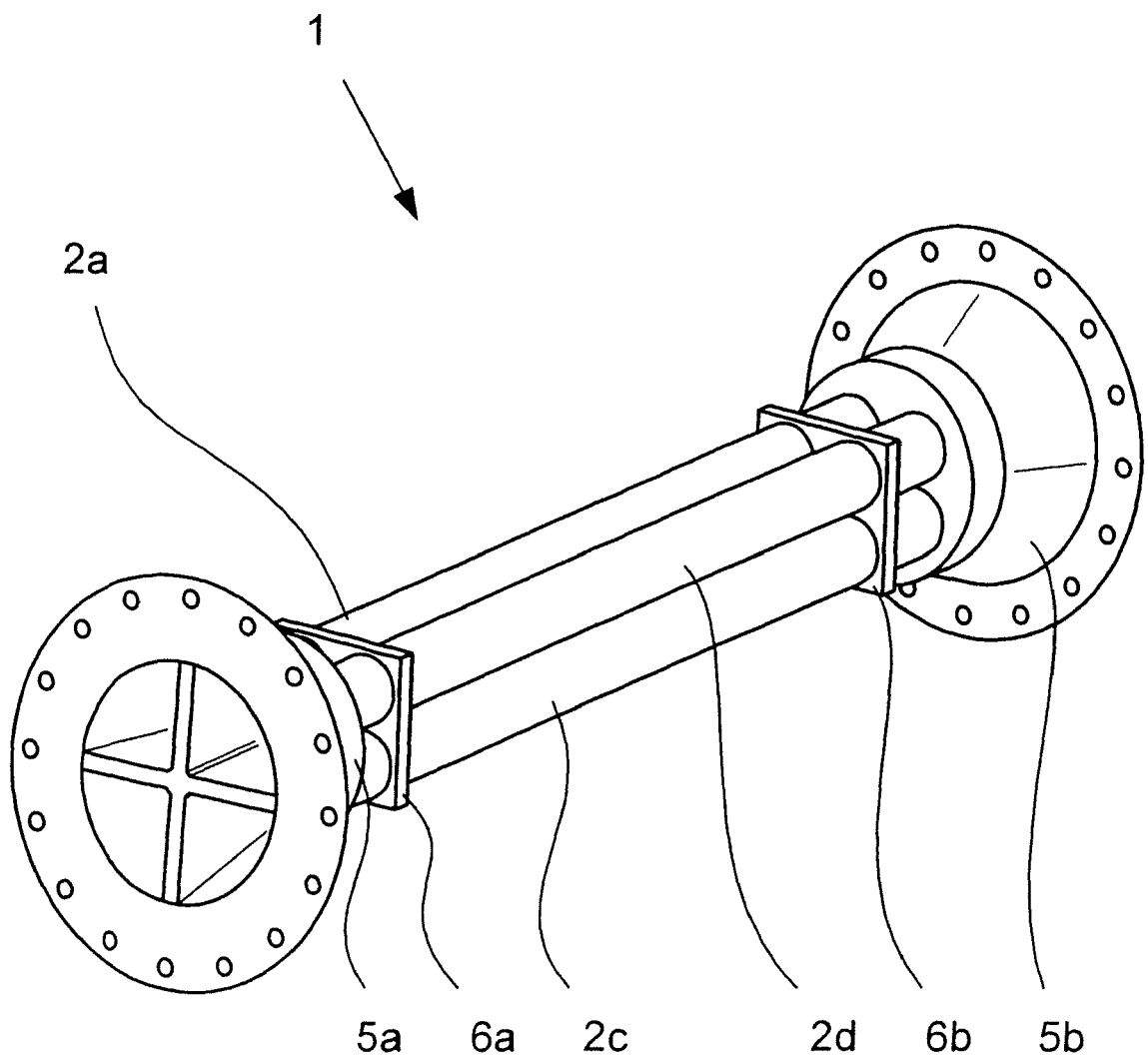
FIG. 1 is a perspective illustration of a mass flowmeter according to the invention.
Figure 2:
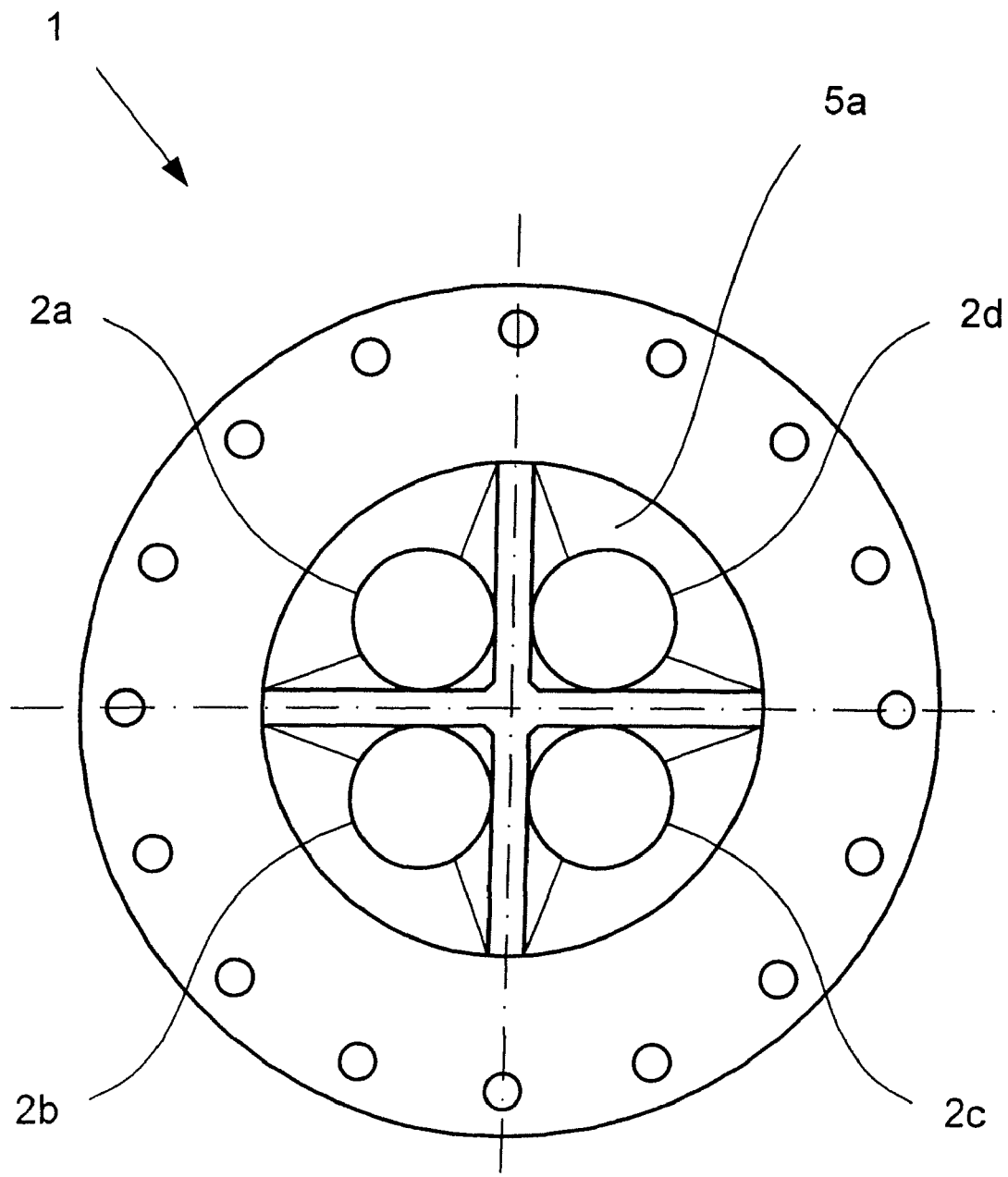
FIG. 2 shows a side view of the mass flowmeter shown in FIG. 1, in the flow direction.
Figure 3:
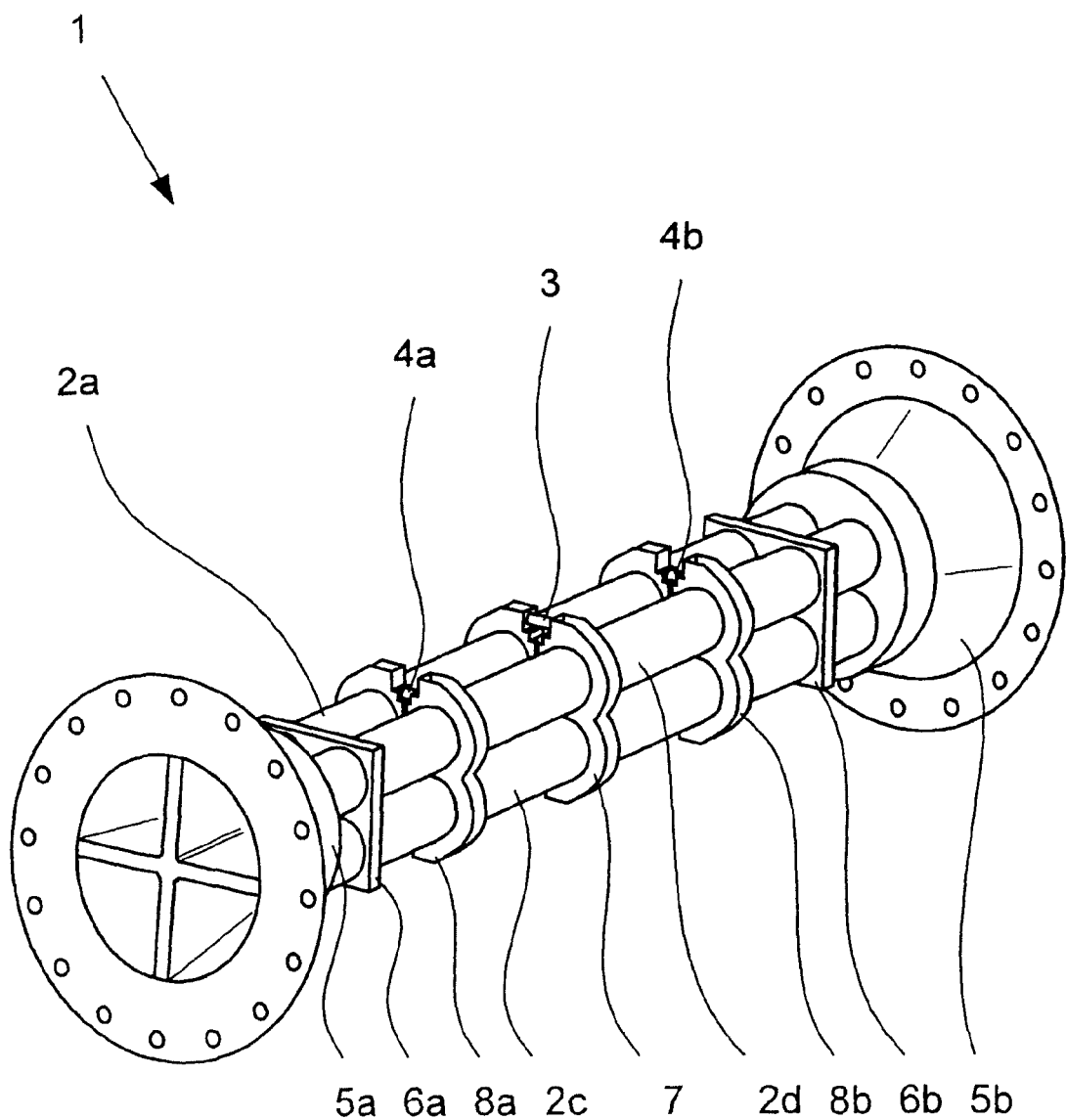
FIG. 3 is a perspective illustration of a mass flowmeter according to the invention, with a mechanical fixing.

FIGS. 1 to 5 illustrate—completely or partially—mass flowmeters 1 which operate on the Coriolis principle. The figures show measurement tubes 2a, 2b, 2c, 2d through each of which a medium can flow and which can be caused to oscillate by an oscillation generator 3, in which case the excited oscillations can then be detected by oscillation sensors 4a, 4b (FIG. 3). The illustrated mass flowmeters 1 are distinguished in that not just one measurement tube 2 or two measurement tubes 2 is or are provided—as known from the prior art—but more than two measurement tubes 2 are provided, specifically a total of four measurement tubes 2a, 2b, 2c, 2d in the present case.

The plurality of measurement tubes 2a, 2b, 2c, 2d make it possible to design the mass flowmeter 1 to be very compact, since the use of a plurality of relatively small measurement tubes 2a, 2b, 2c, 2d overall leads to a larger available flow cross section without disadvantageously influencing the mechanical characteristics of the individual measurement tubes 2a, 2b, 2c and 2d as a result of which the mass flowmeter 1 can be made physically small despite the larger resultant flow cross section.

The use of more than two measurement tubes 2a, 2b, 2c and 2d furthermore has the advantageous effect that the measurement tubes can be arranged "closely"—seen at right angles to the flow direction—and are also arranged closely—as can be seen in FIGS. 1 to 3. In this case, "closely" means that the flow cross section of the measurement tubes 2a, 2b, 2c and 2d makes up a large proportion of the cross section that is physically provided by the mass flowmeter 1. If, for example, just two measurement tubes are used, a very compact form cannot be achieved.

As is illustrated in FIGS. 3 to 5, the measurement tubes 2a and 2b and the measurement tubes 2c and 2d are respectively associated with a measurement tube group, with the measurement tubes 2a, 2b and 2c, 2d in one measurement tube group being mechanically coupled to one another. The mechanical coupling under discussion here in each case means mechanical couplings within the oscillation area of the measurement tubes 2a, 2b, 2c, 2d of the mass flowmeter 1, that is to say not the couplings to the junction pieces 5a, 5b on the inlet and outlet sides of the measurement tubes 2a, 2b, 2c, 2d. The oscillation area of the measurement tubes is located essentially between the oscillation node plates 6a and 6b, which are illustrated in FIGS. 1 and 3 and which in the illustrated exemplary embodiments fix all four measurement tubes 2a, 2b, 2c, 2d uniformly relative to one another.

Figure 4A:
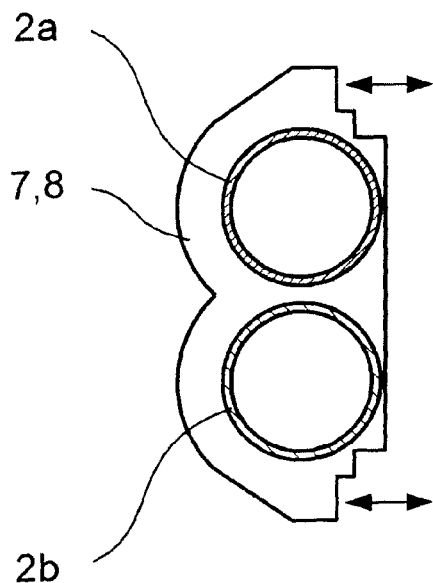
FIGS. 4a, 4b are schematic illustrations of a mass flowmeter according to the invention with a mechanical fixing at points between measurement tubes in a measurement tube group.
Figure 4B:
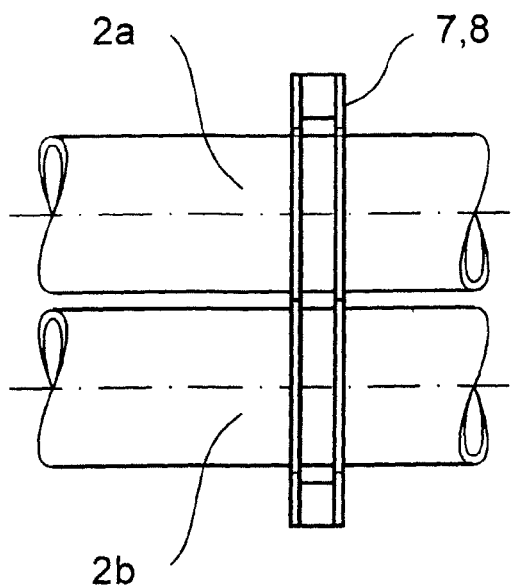

In the case of the mass flowmeter 1 shown in FIGS. 3 & 4, the mechanical coupling is designed such that the measurement tubes 2a, 2b and 2c, 2d in one measurement tube group are mechanically coupled only at points in the flow direction, specifically in the present case by the supporting device 7 of the oscillation generator 3 and by the supporting devices 8a, 8b of the oscillation sensors 4a, 4b. The supporting devices 7, 8a, 8b are split in two, with each part in each case fixing one measurement tube group. One half of the supporting devices 7a, 8a, 8b therefore groups the one measurement tube group, comprising the measurement tubes 2a, 2b, and the other half of the supporting devices 7, 8a, 8b groups the other measurement tube group, comprising the measurement tubes 2c and 2d. The respectively corresponding halves of the supporting devices 7, 8a, 8b are connected to one another only via the oscillation generator 3 and the oscillation sensors 4a, 4b. FIGS. 4a & 4b show two side views of the point connection of the measurement tubes 2a, 2b via the supporting device 7, 8 of the oscillation generator 3 and the oscillation sensors 4a, 4b.

Figure 5A:
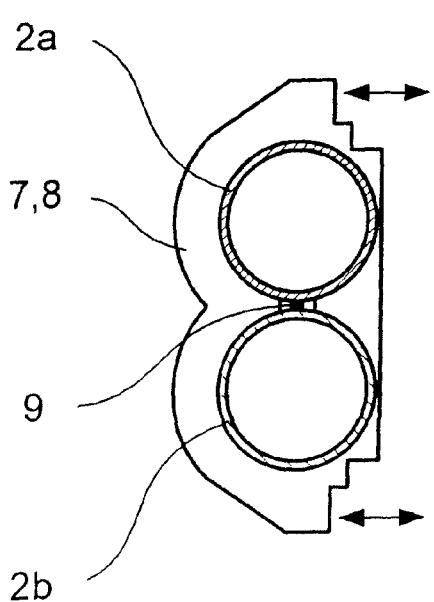
FIGS. 5a, 5b are schematic illustrations of a mass flowmeter according to the invention with a continuous mechanical fixing of measurement tubes in a measurement tube group.
Figure 5B:
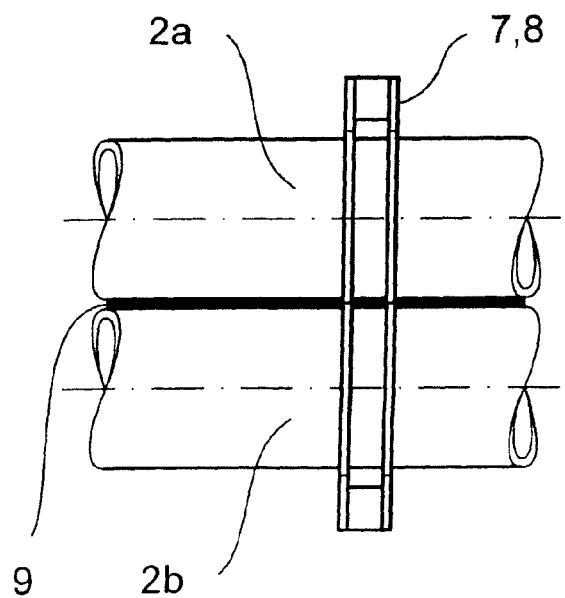

FIGS. 5a, 5b illustrate a further advantageous exemplary embodiment, in which the measurement tubes 2a, 2b in a measurement tube group are connected to one another essentially over their entire extent seen in the flow direction, specifically in the present case by being soldered to one another via a solder web 9. In this refinement, the two measurement tubes 2a, 2b which are soldered to one another in the measurement tube group are fixed to one another over their entire length extent, as a result of which the measurement tubes 2a, 2b can move only as a unit.

FIG. 2, in particular, shows well that the four measurement tubes 2a, 2b, 2c, 2d are arranged, seen in the flow direction, such that their center points form the corner points of a square, which leads to the mass flowmeter 1 having a symmetrical configuration overall with the shape being extremely compact both in terms of the length of the measurement tubes 2a, 2b, 2c, 2d and the cross section of the mass flowmeter, by virtue of the design. One advantageous feature in this case is that the measurement tubes 2a, 2b, 2c, 2d in the present case run essentially parallel to one another and are straight.

What is claimed is:

1. Mass flowmeter which operates on the Coriolis principle, comprising:

three or more measurement tubes through which a medium can flow;

at least one oscillation generator for excitation of oscillations of the measurement tubes, and at least one oscillation sensor for detection of the excited oscillations of the measurement tube;

wherein the measurement tubes are arranged closely as seen at right angles to the flow direction, such that a flow cross section which is covered by the measurement tubes is arranged in as small as an area as possible.

2. Mass flowmeter according to claim 1, comprising four or more of an even number of measurement tubes.

3. Mass flowmeter according to claim 1, wherein the measurement tubes are associated with two measurement tube groups, with the measurement tubes in one measurement tube group being mechanically coupled to one another.

4. Mass flowmeter according to claim 3, wherein the measurement tubes in a measurement tube group are mechanically coupled at points in a flow direction by at least one of supporting devices for the oscillation generators and supporting devices for the oscillation sensors.

5. Mass flowmeter according to claim 3, wherein the measurement tubes in a measurement tube group are connected to one another over an entire extent along a flow direction, and are soldered or welded to one another.

6. Mass flowmeter which operates on the Coriolis principle, comprising:

four or more of an even number of measurement tubes through which a medium can flow;

at least one oscillation generator for excitation of oscillations of the measurement tubes, and at least one oscillation sensor for detection of the excited oscillations of the measurement tube;

wherein the measurement tubes are associated with one another in pairs, and each pair is separately equipped with one or both of oscillation generators and oscillation sensors.

7. Mass flowmeter according to claim 3, wherein each measurement tube group is separately equipped with one or both of oscillation generators and oscillation sensors.

8. Mass flowmeter which operates on the Coriolis principle, comprising:

four measurement tubes through which a medium can flow;

at least one oscillation generator for excitation of oscillations of the measurement tubes, and at least one oscillation sensor for detection of the excited oscillations of the measurement tube;

wherein center points of the measurement tubes form corner points of one of a rectangle, a square, or a rhombus when viewed in a flow direction.

9. Mass flowmeter according to claim 1, wherein the measurement tubes are straight and are arranged parallel to one another.

* * * * *